United States Patent [19]

Jakobsen et al.

[11] Patent Number: 4,464,106
[45] Date of Patent: Aug. 7, 1984

[54] APPARATUS FOR THE PRODUCTION OF A BLANK FOR CONTAINERS

[75] Inventors: Kjell M. Jakobsen, Skanör; Claes T. Nilsson, Löddeköpinge, both of Sweden

[73] Assignee: PLM Aktiebolag, Malmo, Sweden

[21] Appl. No.: 424,271

[22] Filed: Sep. 27, 1982

Related U.S. Application Data

[62] Division of Ser. No. 154,888, May 30, 1980, Pat. No. 4,380,525.

[30] Foreign Application Priority Data

Jun. 11, 1979 [SE] Sweden ............................... 7905043

[51] Int. Cl.³ .............................................. B29C 17/07
[52] U.S. Cl. .................................... 425/525; 425/526; 425/527; 425/529
[58] Field of Search ............... 425/525, 526, 527, 529; 264/521, 527, 530, 552

[56] References Cited

U.S. PATENT DOCUMENTS

| 3,439,380 | 4/1969 | Seefluth | 264/532 X |
| 3,525,123 | 8/1970 | Clines et al. | 264/527 X |
| 3,651,186 | 3/1972 | Hall | 425/529 X |
| 3,691,267 | 9/1972 | Takehara | 264/527 X |
| 3,761,550 | 9/1973 | Seefluth | 264/521 X |
| 4,005,969 | 2/1977 | Farrell | 425/526 X |

FOREIGN PATENT DOCUMENTS 1136815  9/1962  Fed. Rep. of Germany ...... 264/532

Primary Examiner—Jan H. Silbaugh
Attorney, Agent, or Firm—Roberts Spiecens & Cohen

[57] ABSTRACT

Apparatus for producing a tubular pre-moulding of a thermoplastic material, suitable for subsequent blow-moulding to form a container comprising a mold in which a future mouth portion and a portion of adjacent neck section of a tube are moulded to form a pre-moulding, preferably from two mutually joined blank parts, by an axial stretch operation and a blow-moulding operation, the parts in the transition between the mouth portions being severed by a cutting device in order to form two separate blank parts. A tubular pre-moulding is produced after closing one end of the particular blank part and, if necessary, reworking in order to obtain the requisite closing face at the other end.

9 Claims, 14 Drawing Figures

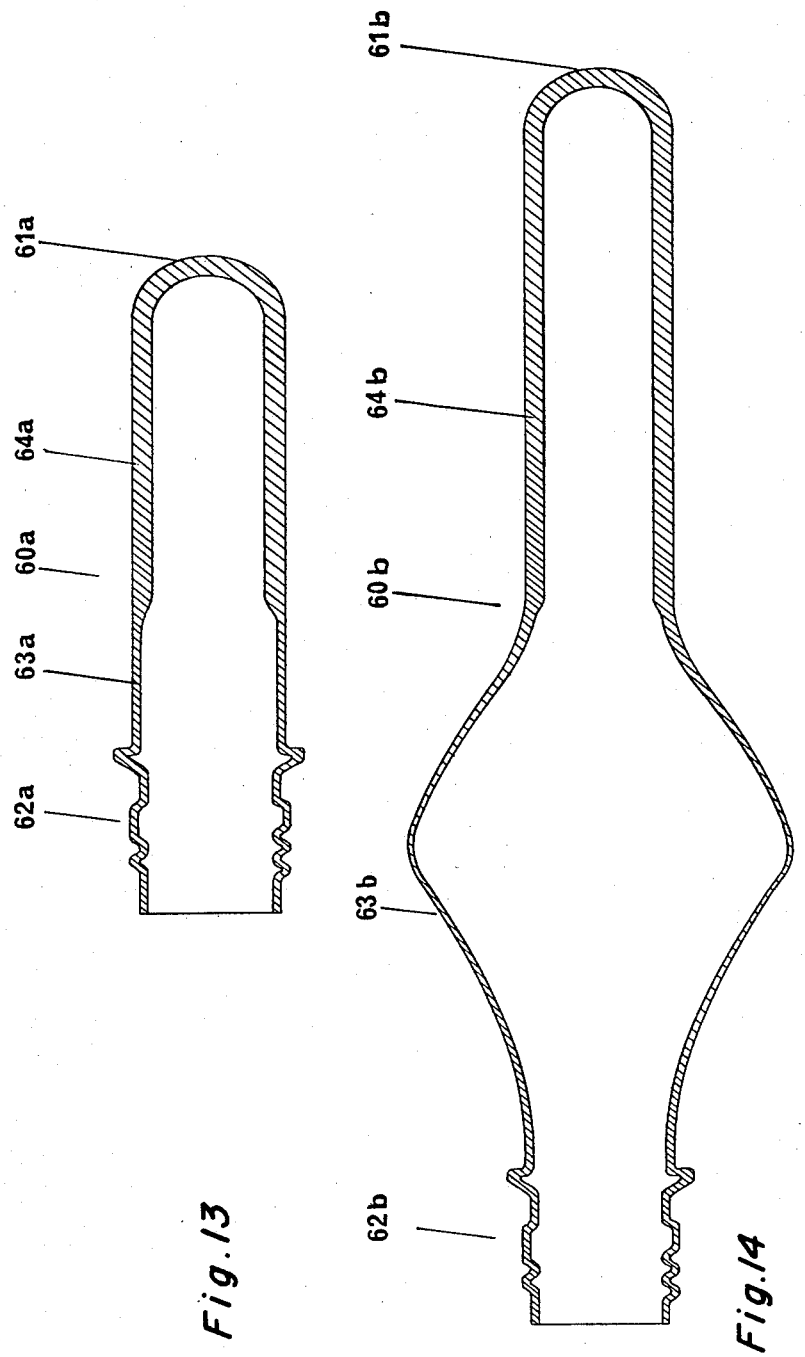

APPARATUS FOR THE PRODUCTION OF A BLANK FOR CONTAINERS

This application is a division of application Ser. No. 154,888, filed May 30, 1980 now U.S. Pat. No. 4,380,525.

BACKGROUND OF THE INVENTION

The invention relates to apparatus for forming a tubular pre-moulding of a thermoplastic material, suitable for subsequent shaping to yield containers by a blow-moulding process. In a tube, future mouth parts and parts of adjacent neck sections are moulded to form pre-mouldings, from two mutually joined blank parts, by an axial stretch process and a blow-moulding process. The parts in the transition between the two mouth parts are severed in order to form two separate blank parts after closing at one of the ends and subsequent reworking to produce the requisite closing surfaces at the respective other ends, the result is two tubular pre-mouldings.

In a production process used for the manufacture of containers from a thermoplastic material, blanks normally called pre-mouldings for containers are produced from severed parts of extruded long tubes of an amorphous thermoplastic material. At one end, the severed pieces are shaped in such a way that they form the future mouth part of the container, whilst while they are closed at the opposite end.

The present invention contemplates apparatus which eliminates certain disadvantages connected with the production process indicated above, according to the known technology.

The invention is suitable especially for the manufacture of containers from a thermoplastic of the polyester or polyamide type. Examples of such materials are polyethylene terephthalate, polyhexamethyleneadipamide, polycaprolactam, polyhexamethylene-sebacamide, polyethylene 2,6- and 1,5-naphthalate, polytetramethylene 1,2-dihydroxybenzoate and copolymers of ethylene terephthalate, ethylene isophthalate and similar polymers. The description of the invention below relates mainly to polyethylene terephthalate, called PET hereinafter, but the invention is not restricted only to the use of either this material or one of the other materials already mentioned; instead, it is also applicable to many other thermoplastics.

For a better understanding of the existing problem and of the invention, several characteristic properties of the polyester polyethylene terephthalate are described below. From the literature, for example Properties of Polymers, by D. W. van Krevelen, Elsevier Scientific Publishing Company, 1976, it is known that the properties of the material change when amorphous polyethylene terephthalate is oriented. Some of these changes are shown in the diagrams, FIGS. 14.3 and 14.4 on pages 317 and 319 in the book "Properties of Polymers". The symbols used in the discussion below correspond to the symbols in the said book.

PET, like many other thermoplastics, can be oriented by stretching the material. Normally this stretching takes place at a temperature above the glass transition temperature Tg of the material. The strength properties of the material are improved by orienting. The literature shows that, in the case of the thermoplastic PET, an increase in the stretching ratio $\Lambda$, that is to say the ratio of the length of the stretched material to the length of the unstretched material, also leads to an increase in the improvement of the material properties. When the stretching ratio $\Lambda$ is increased from about 2 to a little more than 3, particularly large changes in the material properties are obtained. The strength in the direction of orientation is here markedly improved, while at the same time the density $\rho$ and likewise the crystallinity Xc rises and the glass transition temperature Tg is raised. It can be seen from the diagram on page 317 that, after stretching, with $\Lambda$ assuming the value of 3.1, the material withstands a force per unit area, which corresponds to $\delta = 10$, coupled with a very small elongation, while the elongation at $\Lambda = 2.8$ is substantially larger. In the following text, the term "step" is sometimes used to designate orienting which is obtained by stretching, or a reduction in thickness by about 3 times, and which leads to the marked improvements of the material properties, indicated above.

The diagrams referred to above show changes which are obtained on mono-axial orientation of the material. In biaxial orientation, similar effects are obtained in both directions of orientation. Orientation is carried out as a rule by successive stretchings.

Improved material properties, corresponding to those which are obtained by the "step" defined above, are also obtained if an amorphous material is stretched until it flows and, before flowing, the material is at a temperature which is below the glass transition temperature Tg. In a rod being drawn, a reduction of the diameter of about 3 times results in the flow zone. On drawing, the flow zone is continuously displaced into the amorphous material, while at the same time the material, which has already undergone the state of flowing, absorbs the tensile forces of the test rod without an additional permanent stretching.

For bottles, defined external diameters of the mouth with the associated thread are standardized and, the conventional blow-moulding technology determines the greatest diameter which is permissible in the blow-moulded container body. The reasons for this are explained in more detail in the following text. In order to obtain an amorphous starting material for the pieces of tube, which are to be shaped into pre-mouldings, the material must be cooled rapidly to below the glass transition temperature Tg after extruding—in the case of extruded tubes from which the pieces of tube are severed. In the case of excessive wall thickness, the material does not possess adequate heat conductivity to enable the central sections of the wall to be cooled as rapidly as required, so that the material located in the center becomes crystalline and opaque. For this reason, viewed theoretically, the largest possible wall thickness of the extruded tubes is less than about 9 mm. In practice, however, wall thicknesses of less than 4 mm are used as a rule. In fact, in blow-moulding a pre-moulding having wall material of excessive thickness, problems arise due to the cooling of the material during the actual blow-moulding step and before the material reaches the wall of the mould. The blow-moulded container is no longer clear as glass and, instead, contains opaque white sections. In blow-moulding, in order to obtain containers having the requisite resistance against stresses and penetration of the container wall, the wall thickness of the finished container must not fall below a defined value. Moreover, a reduction of the external diameter of the tube during the shaping of the mouth part of the pre-moulding is not possible in accordance with known technology. The result is that the desired mouth diameter of the blow-moulded container is decisive for the diameter of the pre-moulding and thus for the maximum diameter of the blow-moulded container body. If bottles of large capacity are required, these bottles are extended, according to known technology, in the axial direction after they have reached the maximum possible diameter. In addition to the disadvantage of a certain instability, the extension represents an unsatisfactory utilisation of the quantity of material in the container body since the requisite quantity of material per unit volume of storage capacity is greater than would be necessary if both the diameter and the length of the container body were adapted to the actual volume required. Moreover, the unnecessarily large surface of the container leads to a corresponding increase in the overall penetration of carbon dioxide during the storage of beverages containing carbonic acid.

To utilize the material properties of the material in the best way, it is desirable that the diameter of those parts of the pre-moulding which, after the blow-moulding step, represent the actual container body, is given a value which has the result that the material in the blow-moulded container body assumes the desired orientation. In containers of PET it is desirable that the material, in conjunction with blow-moulding, is biaxially stretched in such a way that the product of the stretchings is about 9.

The above shows that, according to known technology, the quantity of material in the mouth part is not determined by the calculated stresses but by the maximum diameter of the container body. As a rule, this leads to a considerable excess of material in the mouth part.

For example, in a PET bottle of 1 liter capacity, the mouth part can, according to known technology, contain up to 25-30% of the total quantity of material. Disregarding the unesthetic appearance of the oversizing of the mouth part, this fact also results in a waste of material, which is of importance in the mass production of articles.

In the technology applied at present, the mouth part and adjacent neck parts consist of unoriented material, that is to say amorphous material. This means that the material in the mouth part including the adjacent neck parts has properties which differ from those of the container body. In containers of, for example, PET, the material in the mouth part has a glass transition temperature $T_g$ of 71° C., while the glass transition temperature of the material in the container body is about 81° C. It follows from this that the material in the mouth part softens at a lower temperature than the material in the container body.

It is already known, by cold-forming of the mouth part of the blank, to displace material downwards from the mouth part into the sections of the blank, which later represent the wall sections of the container body. In this way, a certain matching of the quantity of material in the mouth part to the future stresses is achieved but, between the actual container body and the mouth part, neck sections are formed in which the material is stretched by a factor of less than 3. These neck sections in the moulded container thus consist of inadequately oriented material, while at the same time the wall thickness is undesirably large. This method is known from our Swedish patent application No. 78/02,362-9 to which U.S. patent application No. 182,086 corresponds.

French patent application No. 74/39,648 and corresponding British Pat. No. 1,530,305 disclose a method wherein a tubular blank, which is closed at one end and which is provided at the other end with beading for fixing the blank in a downstream blowing element, is injection-moulded and wherein the tubular blank is blow-moulded after a certain reshaping to give a container. Material in the tubular part of the blank is expanded in the radial direction at a temperature above the glass transition temperature $T_g$ in order thus to form the mouth part of the container. A container formed in the manner described possesses a mouth part and a neck section in which the material has been exposed to only very slight stretching and hence orienting, so that the disadvantages, already indicated, with respect to the mouth part of the known containers are also present in this container.

The method disclosed in the aforesaid French Application also has the disadvantage that only a part of the material content of the injection-moulded tubular blank is utilized when reshaping the blank to give the finished container. It is obvious that the losses of material, which occur in this process, represent an economic disadvantage in the mass production of articles.

From Federal German Offenlegungsschrift DOS No. 2,540,930, and corresponding U.S. Pat. No. 4,264,558 a process is known wherein a tubular blank of PET is reshaped to give a container and wherein the container wall consists of a material which is stretched by a factor of, for example, more than 1.5. The bottom part of the container consists of an amorphous unoriented material, while the neck sections of the container consist of material which has been oriented only to a slight extent. As a result of heating and crystallization caused thereby, the strength of the material is improved in the unoriented zones which at the same time become opaque. Furthermore, a combination of the methods indicated above results in an undesired oversizing of the neck sections of the containers, while the latter at the same time have poorer properties than the material in the actual container body.

SUMMARY OF THE INVENTION

It is an object of the invention to provide apparatus for forming a blank which makes it possible that, in a container formed from the blank, both the mouth part and the neck sections and also the container body consist of a material which is adapted to the occurring stresses and in which the material in such parts is oriented to a satisfactory extent in such a way that the material is stretched, at least in the axial direction, by a factor of more than 3.

This results in the advantage of a raised glass transition temperature $T_g$ in all such parts of the container. This means that all such parts will have the same heat resistance. This is a great advantage compared with containers which are formed according to the known technology and which, at least as far as containers with mainly clear and transparent materials are concerned, have neck sections and mouth parts which are more sensitive to heat stresses than the actual container body.

Another object of the invention is to provide apparatus for forming a blank by which a container of smaller mouth diameter can be manufactured, the length and diameter of the container body being matched to the storage capacity of the container in such a way that the smallest possible quantity of material per unit volume of storage space results.

In addition a further object of the invention is to provide apparatus for forming a blank from which a container of any desired shape of the neck part can be formed from the blank, the container material in the mouth part and in the neck part also being oriented and having a crystallinity of more than 10%; this was achieved by stretching the material to the requisite extent, for example in the case of containers of PET by stretching in the axial direction by a factor of more than 3. According to known technology it was hitherto not possible to obtain such a degree of orienting, unless the mouth part and neck sections of the containers were to consist of mainly unoriented material, in which case the neck sections merge in the shortest possible distance with oriented sections of the container body, where the wall thickness has been reduced by a factor of at least 3. This shaping represented an attempt to reduce the size of that zone in the neck part, which has mainly amorphous material and low orientation and hence a low glass transition temperature Tg.

According to the invention, a tube of a thermoplastic is clamped between two mutually separate clamping devices. The material in the zone between the two clamping devices is stretched in the axial direction of the tube by shifting the clamping devices in the direction away from one another. When PET is used, stretching by a factor of at least 3 takes place.

According to one embodiment of the invention, the material in the tube is stretched, while the material is at a temperature above the glass transition temperature Tg, whereas in another embodiment the material is stretched in the cold state, which means that the material is at a temperature below the glass transition temperature Tg at the beginning of the stretching step. On stretching "in the cold state", the material is drawn until flow sets in.

After stretching, at least the central sections of the drawn material are blow-moulded at a temperature above the glass transition temperature Tg against a mould, in order to form, for example, threads and, in some cases which may occur, parts of the adjacent neck sections, while two future mouth parts are in adjacent positions.

Subsequently, the tube is severed at the transition between the two future mouth parts. Each of the two severed blank parts thus produced form a tubular pre-moulding, after closing at one end and, if appropriate, reworking at the other end in order to obtain the required closure surfaces.

In optional embodiments of the invention, the material is heated before the axial stretching to a temperature above the glass transition temperature Tg, or the stretching step is preceded by a blow-moulding step in which the heated material is subjected to a certain expansion in order to increase the diameter of the zone.

In another embodiment of the invention, the mouth parts of the pre-mouldings are shaped by simultaneous axial stretching, and blow-moulding for the purpose of a radial expansion of the heated material.

In certain application examples, the heated material zone has a temperature profile such that one or several annular zones are at a temperature which exceeds the temperature of the adjacent material by 3°–20° C., preferably 10°–15° C. The actual drawing or stretching step starts in the material zones of higher temperature.

In an application of the invention, wherein the material in the tube is, at the start of axial stretching of the material, at a temperature which is less than the glass transition temperature Tg, the drawing or stretching step is initiated, according to an optional embodiment of the invention, with the aid of pressure forces. This is achieved, for example, by means of a ring which surrounds the tube, the inner surface of the ring being brought into contact with the outer surface of the tube by reducing the internal diameter of the ring.

During axial stretching of the material, the external diameter of the tube is reduced. As a result of the invention, it is thus possible to produce a pre-moulding, the mouth part of which has an external diameter which is less than the external diameter of the tube.

Apparatus for carrying out the process comprises a number of stretching and blow-moulding devices, which are each provided with two clamping devices which are located at a certain spacing from one another. The clamping devices are provided for clamping a tube, and the two sets of clamping devices are arranged in such a way that they can be shifted towards one another or away from one another. The contact surfaces of the clamping devices with the tube are cooled. Appropriate devices are provided for heating the material in the tube between the sets of clamping devices, and also the blow-moulds against which the heated material is blown. Moreover, the apparatus comprises elements for closing the two ends of the tube before blow-moulding and also elements for applying an elevated pressure to the closed cavity formed in this way. In certain illustrative embodiments, a cylindrical rod is also fitted axially in the tube. Finally, an element for severing the tube into two preferably equal parts is present.

In one embodiment of the invention, the clamping devices are arranged in such a way that the tube can rotate about its own axis. In this way, heating of the material in the zone between the two sets of clamping devices and also the severing of the tube into two equal parts are facilitated.

In forming a blank, the tube is fixed between the two clamping devices, after which the latter are shifted in the direction away from one another, in certain illustrative embodiments after the material between the two sets of clamping devices has first been heated to the desired temperature profile and, in certain cases, with simultaneous radial expansion of the material in the tube or after a first radial expansion of the material in the tube has taken place. The length of displacement relative to the length of the part of the tube, the material of which is stretched, is selected in the case of PET in such a way that the material reaches a crystallinity of at least 10% on axial orientation. In some cases which may occur, a cylindrical rod is introduced into the tube before the material is stretched. In certain application examples, the rod is heated. To effect radial expansion, the two ends of the tube are closed, the material between the two sets of clamping devices is heated in some cases which may occur, and the closed space in the tube is subjected to pressure, the heated material expanding in such a way that it makes contact with the mould surfaces, for example for the purpose of moulding the mouth thread and adjacent neck sections. When the material has cooled to a sufficient extent to reach dimensional stability, the tube is severed into two parts in the severing element. Each of the two parts is closed at one end by reshaping and, if appropriate, reworked at the other end, that is to say the mouth end, in order to produce the requisite closing surfaces. Thus, the pre-moulding is completed.

According to the process carried out by the apparatus, each drawing step with subsequent severing results in two blank parts which, after a certain reworking and reshaping, each form a blank. In this manner, no losses of material arise in the production of pre-mouldings. Of course, the stretched material formed during the drawing step can be adapted in such a way that it is used for forming exclusively one single future mouth part with adjacent future neck sections. Due to the severing of parts of the piece of tube, which can not be used for further production of the pre-moulding, however, this leads to undesired losses of material, so that this embodiment of the invention is only used in special cases, for example in the production of pre-mouldings which are intended for containers having long mouth sections and neck sections.

BRIEF DESCRIPTION OF THE DRAWING

FIG. 13 shows a completed tubular pre-moulding which has been shaped from a blank part according to FIG. 5, and FIG. 14 shows a completed tubular pre-moulding which has been shaped from a blank part according to FIG. 12.

DESCRIPTION OF THE PREFERRED EMBODIMENTS

Figure 1:
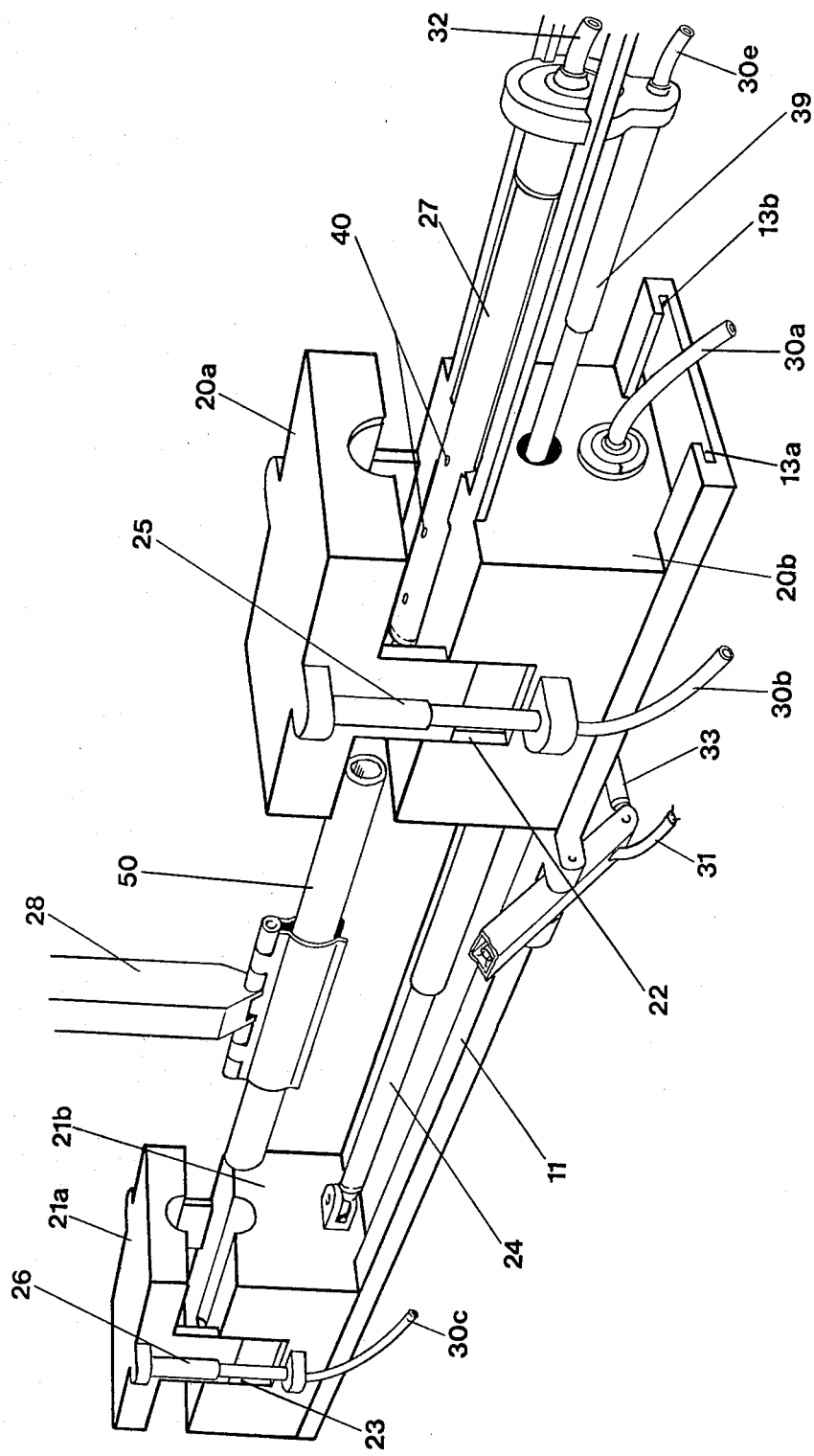
FIG. 1 shows, in perspective view, a stretching and blow-moulding device having two sets of clamping devices, and the two sets of clamping devices being in a position for receiving a length of tube.
Figure 2:
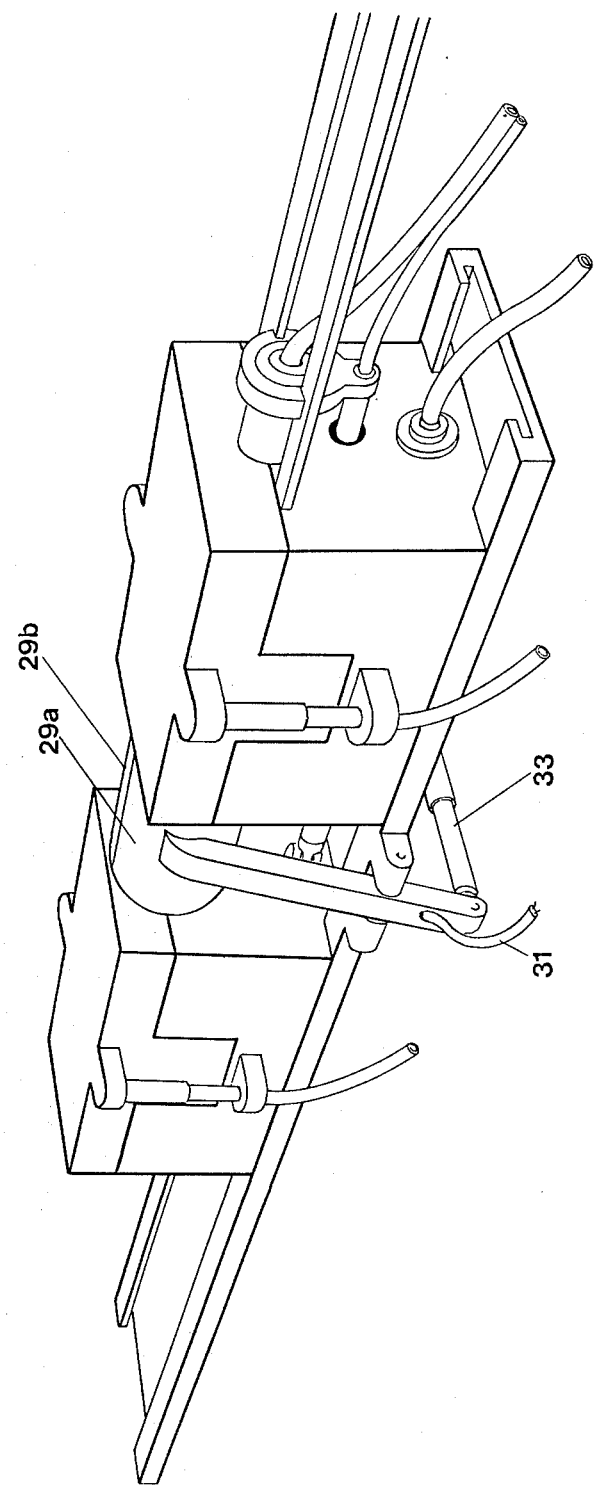
FIG. 2 shows, in perspective view, a stretching and blow-moulding device, with the clamping devices in a position for fixing a piece of tube.

FIGS. 1 and 2 show a frame on which two separate sets of clamping devices 20a–b and 21a–b are located. In principle, the two sets of clamping devices consist of an upper clamping part 20a, 21a and a lower clamping part 20b, 21b. In both sets of clamping devices, the upper part can be shifted between an open position and a closed position. In the closed position, the particular set of clamping devices fixes one end of a tube 50 in each case. The two sets of clamping devices can be shifted from their starting positions (FIG. 1) towards one another up to a smallest distance (FIG. 2) which matches the length of the tube 50, and from there they can be shifted back again into the particular starting position. In the starting position, the particular upper part assumes the open position and remains in the latter until the two sets of clamping devices have been shifted towards one another up to the said smallest distance. In this position, the particular upper parts assume the closed position and thus cover a relatively large part of the tube 50, the latter being surrounded at the same time and being fixed by the particular set of clamping devices. While the upper parts are still in the closed position, the two sets of clamping devices are subsequently shifted back to the starting position. The shift of the upper parts 20a, 21a of the two sets of clamping devices is effected by means of drive mechanisms 25, 26, and a drive mechanism 24 is provided for shifting the two sets of clamping devices towards one another. The two upper parts slide in the grooves 22, 23 provided in the lower parts, while the lower parts slide in grooves 13a–b provided in the frame 11.

A gripper 28 is provided for inserting the tube 50 into the clamping devices or removing it from the clamping devices. When the two sets of clamping devices are at their smallest distance from one another, a heating element consisting of the two heating jaws 29a–b is brought into a position in which it can heat the central sections of the tube 50. The movement of the heating jaws is effected by means of a drive mechanism 33 with a push-and-pull bar. A lead 31 for heating the heating jaws, for example by means of electric power, is shown in the figures.

Adjoining one of the two sets of clamping devices 15, a cylindrical forming and blowing mandrel 27. This mandrel is moved by means of a drive mechanism 39 from and to a position in which the cylindrical part of the mandrel protrudes a little into the opening of the other set of clamping devices. The mandrel protrudes into the said opening even when the two sets of clamping devices are in their starting positions.

The external diameter of the mandrel and the internal diameter of the tube 50 are matched in such a way that the mandrel can be introduced into the tube. Moreover, the mandrel is provided with a row of orifices 40 which lead to a cavity in the interior of the mandrel, which cavity is connected to a line 32 for a pressure medium.

A pressure medium is fed via the lines 30a, b, c, e (the pressure line 30d is not shown in the figure) to the individual drive mechanisms 24, 25, 26, 33 and 39.

Figure 3:
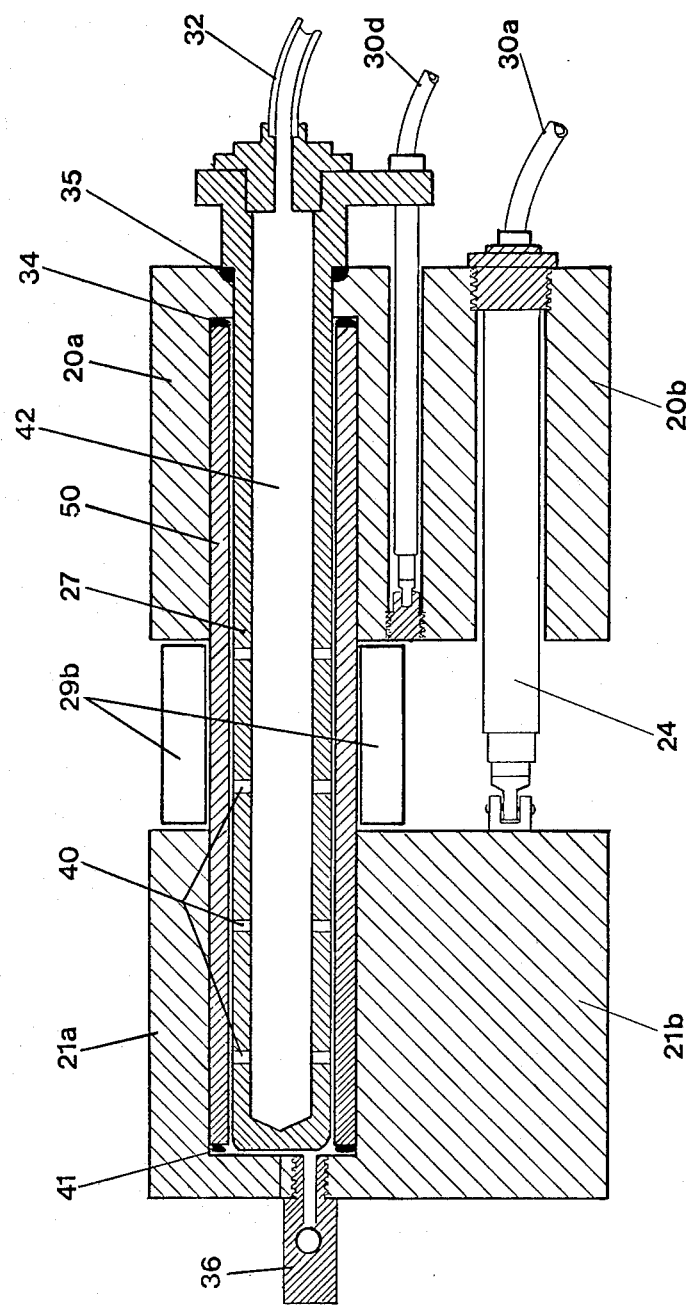
FIG. 3 is a sectional view of the stretching and blow-moulding device during the heating of a central part of a length of tube.

In FIG. 3, the two sets of clamping devices 20a–b, 21a–b are shown in the position for the smallest distance between the sets. In addition, the figure shows the said cavity 42 in the mandrel 27, a gasket 41 between one end of the tube 50 and the set of clamping devices 21a–b and a gasket 34 between the other end of the tube 50 and the set of clamping devices 20a–b. A gasket 35 between the mandrel 27 and the set of clamping devices 20a–b can also be seen. An outlet valve 36 is located in the lower clamping device 21b. In this way, a closed space which can be subjected to pressure through the orifices 40 is formed in the mandrel 27.

Figure 4:
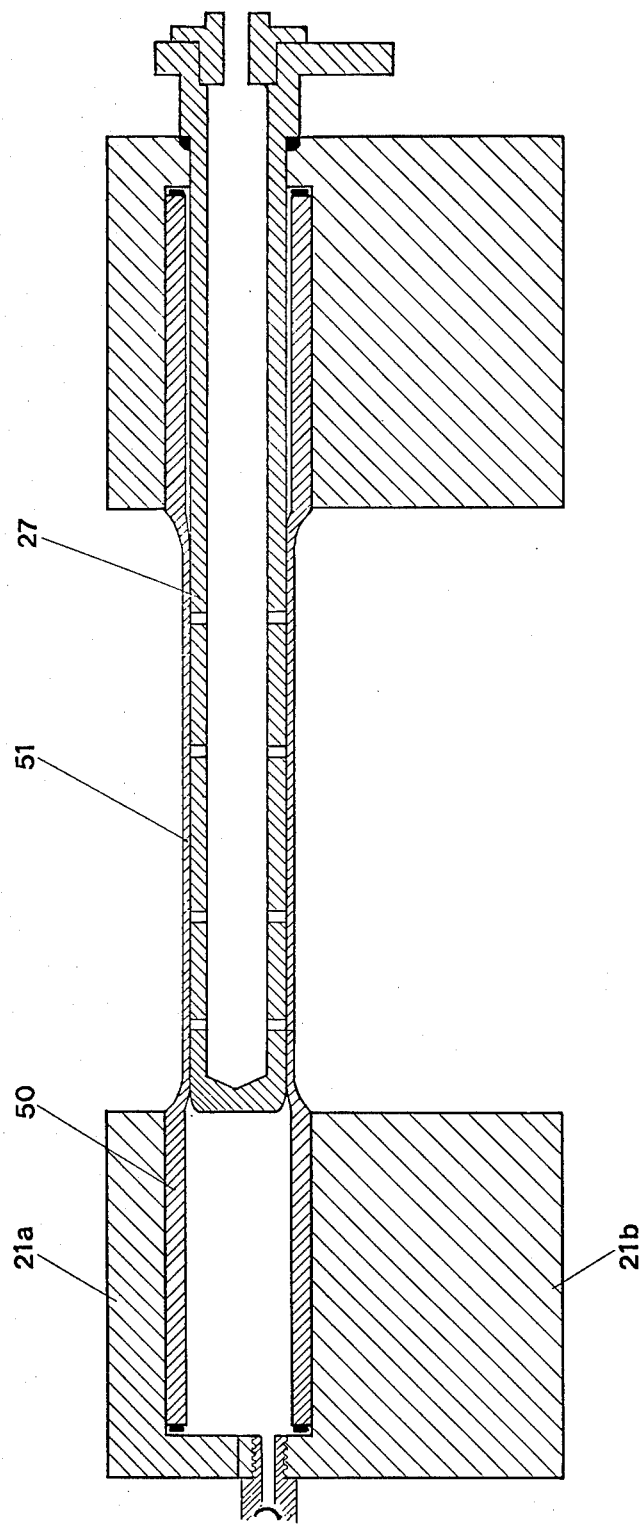
FIG. 4 is a sectional view of a stretching and blow-moulding device with the tube fixed and drawn.

FIG. 4 shows the two sets of clamping devices shifted back to their starting positions, while the surrounded parts of the tube 50 are still held firmly as before. FIG. 4 shows that the mandrel 27 continues to project into the set of clamping devices 21a–b. A central zone 51 of the tube 50 has been stretched in the axial direction and has a smaller wall thickness than the remainder of the tube while the diameter is seen not to have undergone any substantial change.

Figure 5:
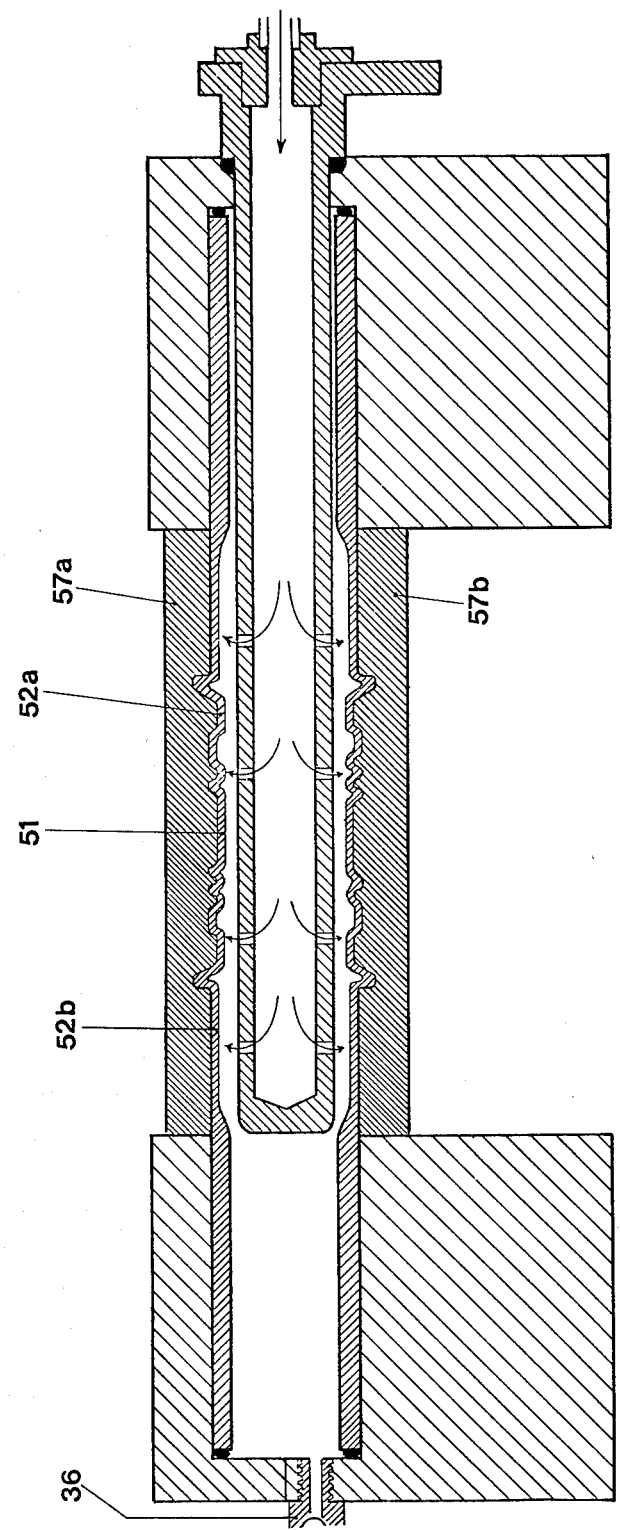
FIG. 5 is a sectional view of a stretching and blow-moulding device with the internal volume of the tube subjected to pressure in order to form the mouth sections and adjacent neck sections.

In FIG. 5, the central zone 51 has been blow-moulded against the mould 57a–b. The shaping surface of the mould corresponds to the form of two mouth parts 52a–b, facing one another, for containers which are to be formed from the blanks and are in the process of manufacture.

Figure 6:
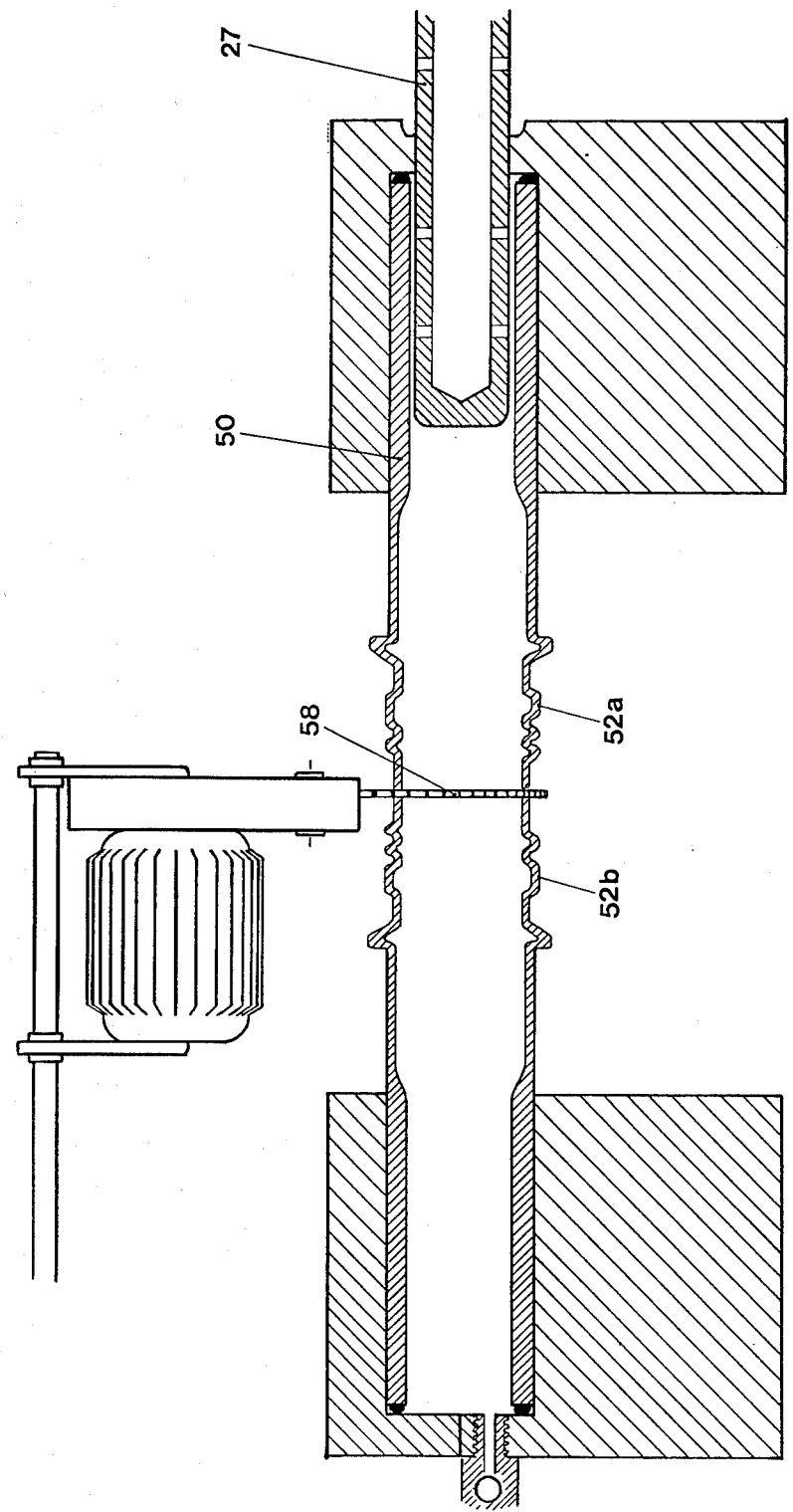
FIG. 6 shows a device for severing the tube into two separate blank parts.

FIG. 6 shows the mandrel 27 in its starting position. A severing disc 58 is located in the position for severing the tube 50, that is to say at the transition between the two moulded mouth parts 52a–b.

Figure 10:
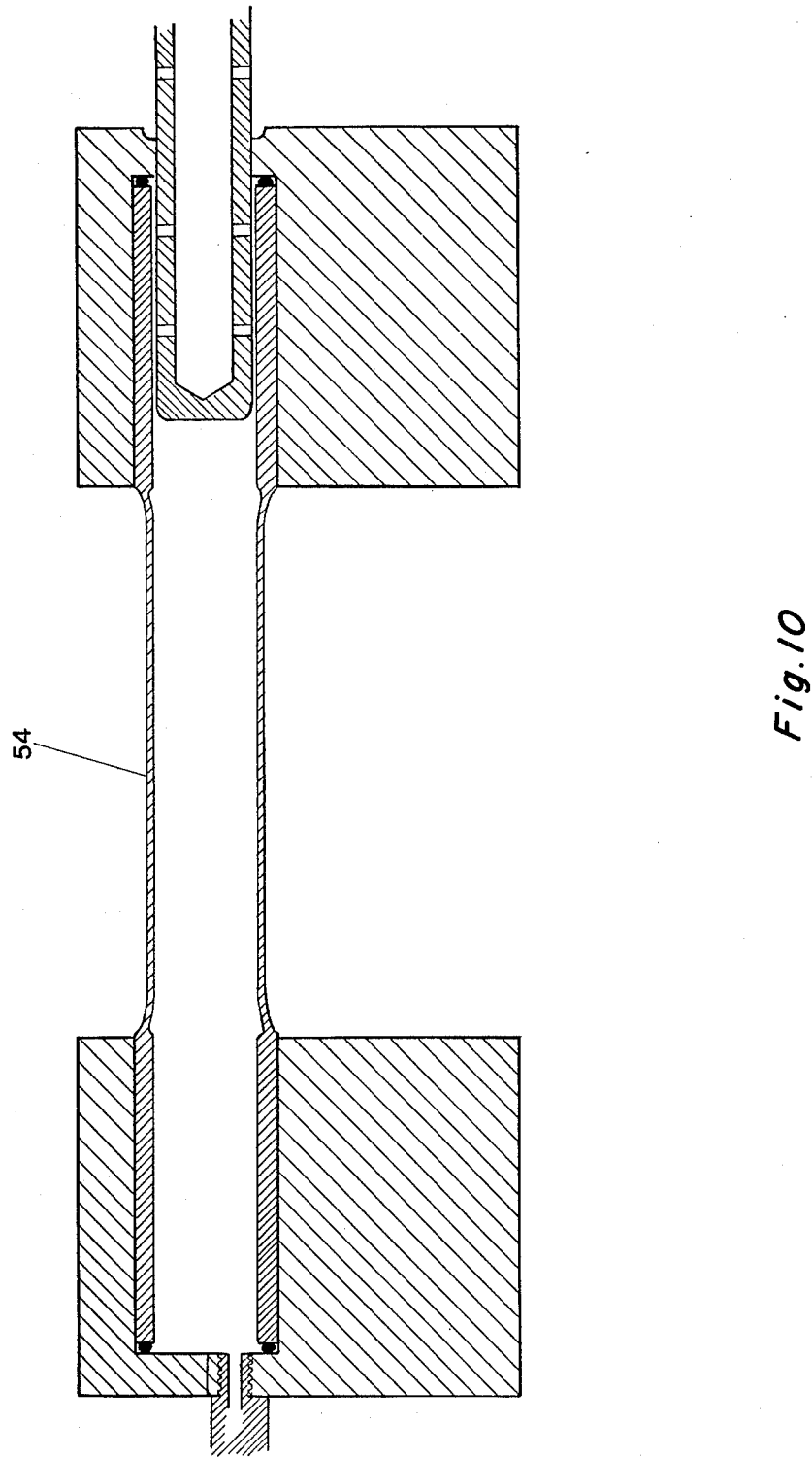
FIG. 10 is a sectional view of a stretching and blow-moulding device after the cold-drawing of the tube has been carried out.

FIG. 10 shows a turntable 7 which rotates about a bearing 12. Next to the turntable, a number of positions A-U is indicated. A frame with the associated set of clamping devices, drive mechanisms, tubular mandrel, heating device and the like according to FIGS. 1-2 is located on the turntable for each position. In the positions, the particular working step is indicated diagrammatically by the position of mandrel, heating jaws, sets of clamping devices and the like.

Figure 8:
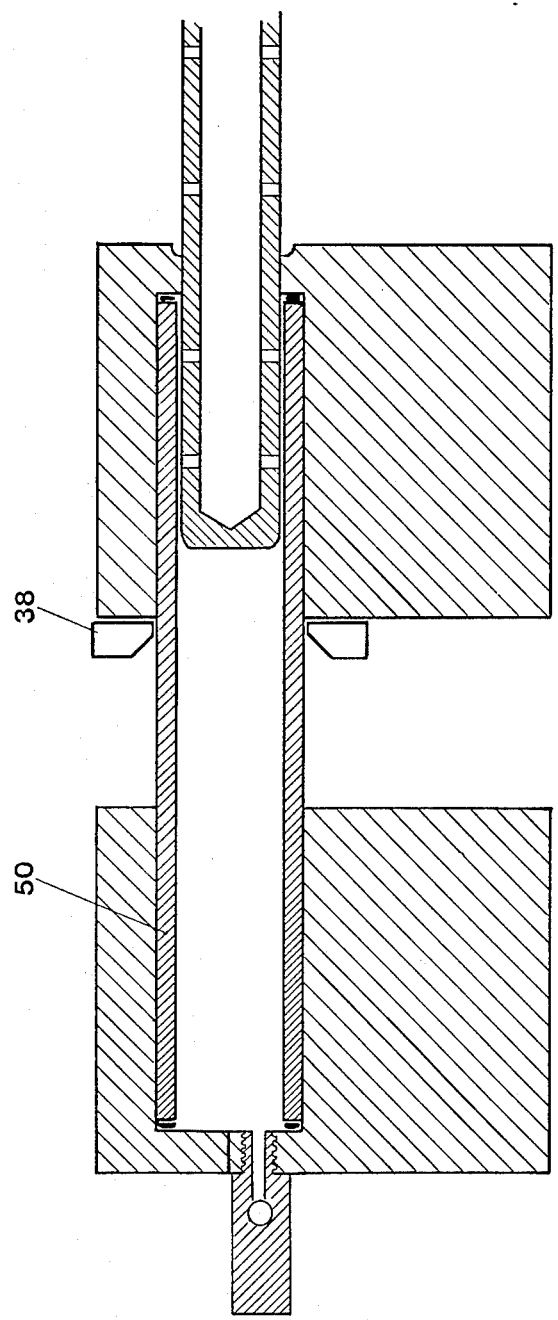
FIG. 8 is a sectional view of a stretching and blow-moulding device having a device for heating an annular section in the tube.

FIG. 8 shows an embodiment of the invention, which is adapted preferably for so-called cold-drawing of the tube. An annular heating element 38 is located between the two sets of clamping devices. By means of this heating element, the central sections of the tube 50 are heated to an elevated temperature over an annular zone.

Figure 9:
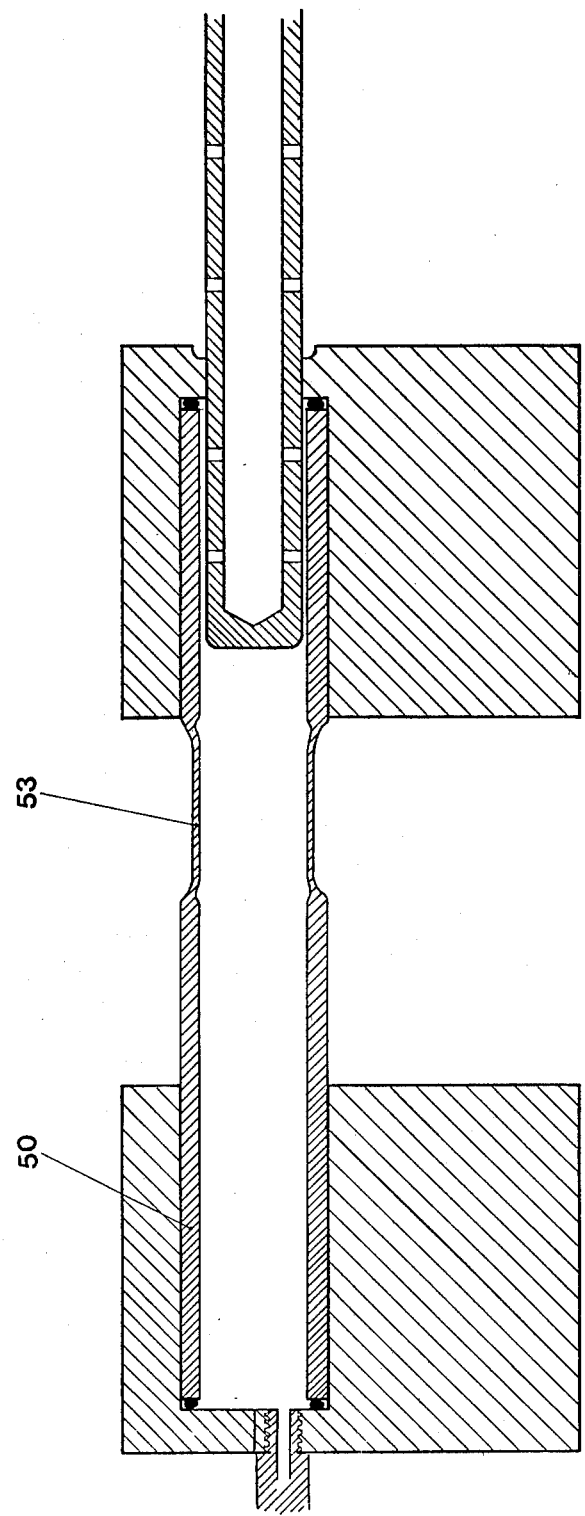
FIG. 9 is a sectional view of a stretching and blow-moulding device during the cold-drawing of the tube.

FIGS. 9-10 relate to the cold-drawing of the tube 50. In FIG. 9, the formation of a centrally located drawn zone 53 has started, while in FIG. 10 the entire centrally located drawn zone 54 has been formed.

Figure 11:
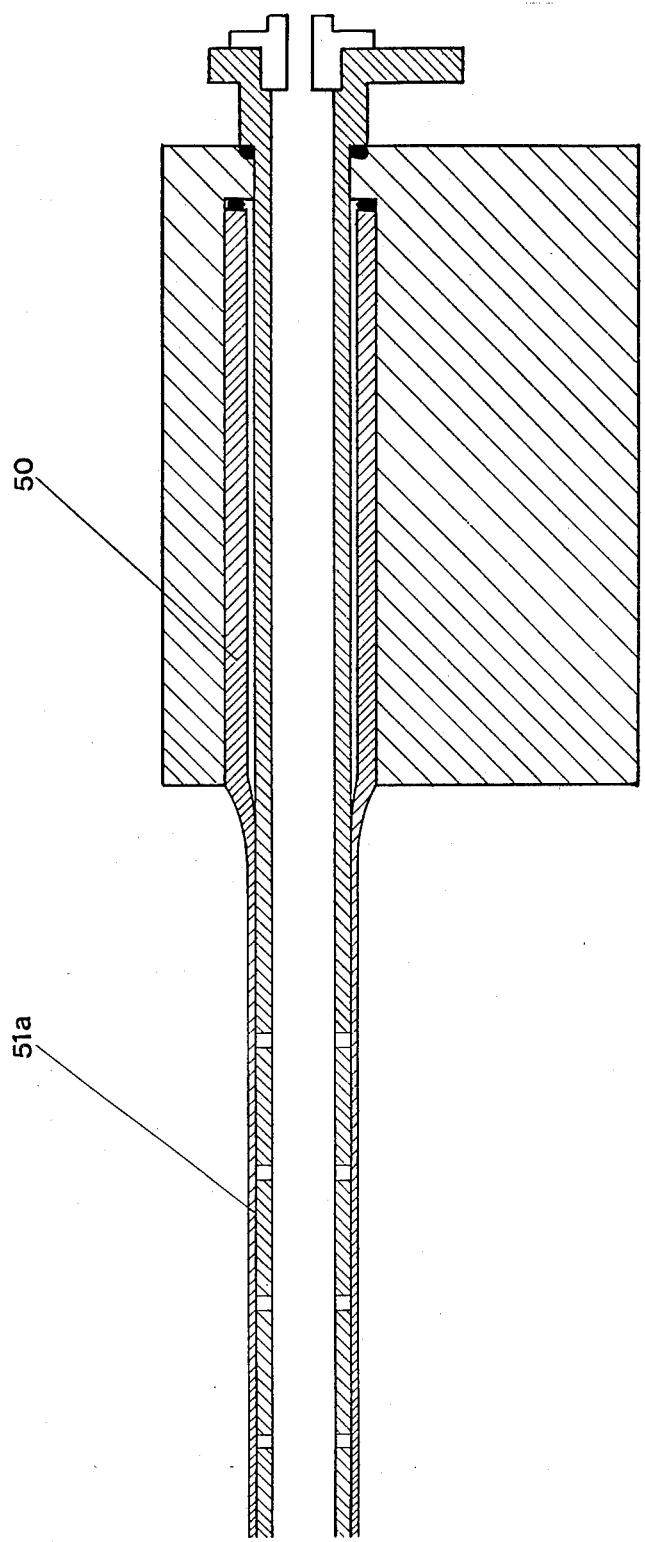
FIG. 11 is a sectional view of a stretching and blow-moulding device with the length of the axially drawn zone increased.
Figure 12:
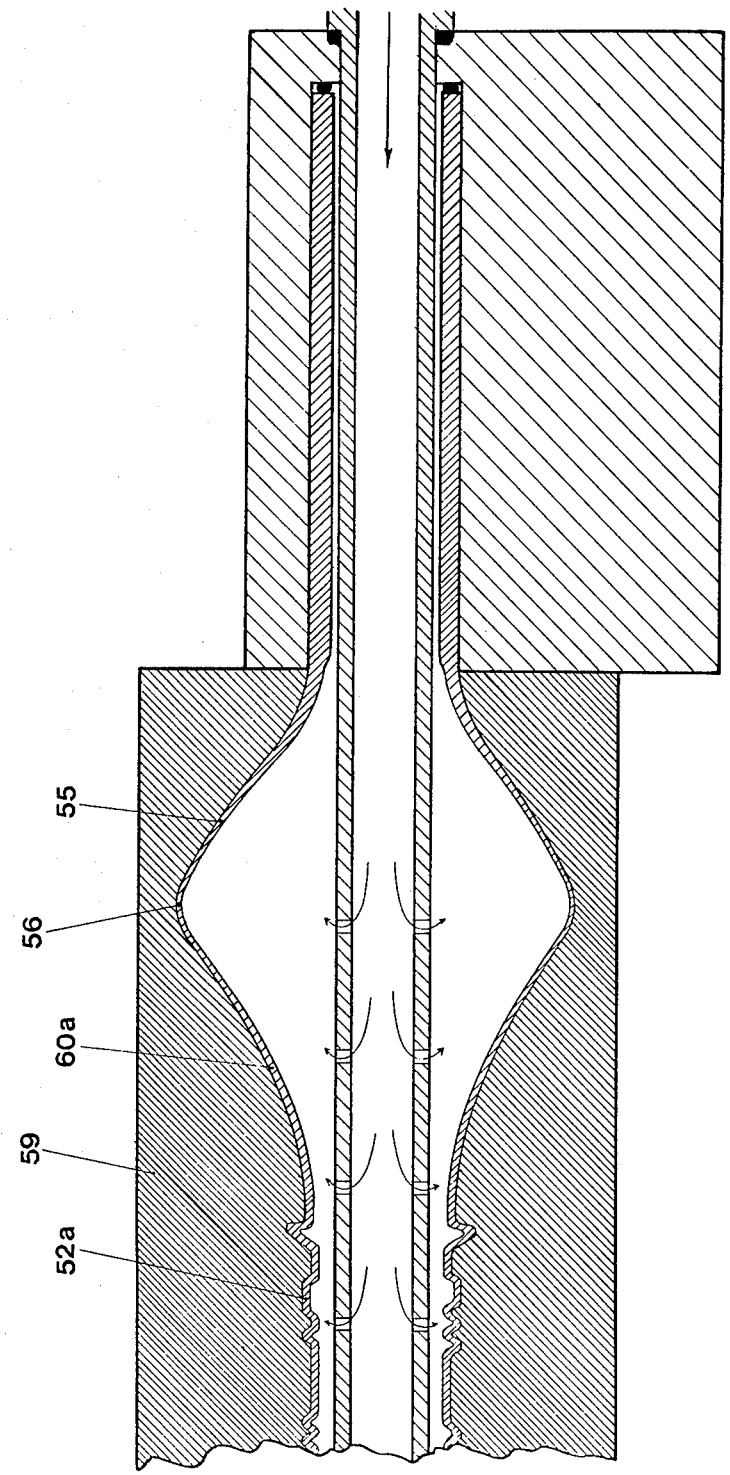
FIG. 12 is a partial section through a stretching and blow-moulding device according to FIG. 11, in which the internal volume of the tube has been subjected to pressure, and in particular the forming of the neck sections adjacent to the mouth part.

FIGS. 11 and 12 relate to a variant of the invention wherein the centrally located zone 51a of the tube 50 is longer than in the previously described embodiments of the invention. The figures show only one of the two sets of clamping devices. FIG. 11 shows the position after drawing of the tube has been completed, while FIG. 12 shows the central zone 51a (FIG. 11) after it has been blow-moulded against an outer mould 59. The moulding surface of the outer mould corresponds to the shape of two mutually facing mouth parts (only one, 52a, is shown in the figure) and parts of the adjacent future neck section 60a of the containers which are to be formed from the blanks and are in the process of production. A zone 56, having the largest diameter in the moulded future neck sections, preferably has a diameter which is at least three times the original diameter of the tube.

FIGS. 13 and 14 show completed tubular pre-mouldings, the pre-moulding according to FIG. 13 having been formed from a blank part shown in FIG. 5 and a pre-moulding according to FIG. 14 having been formed from a blank part shown in FIG. 12. At one end, the pre-mouldings have a mouth part 62a, b with adjacent neck sections 63a, b. At the other end the pre-mouldings have a closure 61a, b. A tubular section 64a, b can be seen between the closure 61a, b and the neck sections 63a, b.

In the production of a pre-moulding according to the invention, a tube 50 is brought into the position shown in FIG. 1 with the aid of the gripper 28. The two sets of clamping devices 20 and 21 are shifted towards one another with the aid of the drive mechanism 24 until the two ends of the tube are in contact with the gaskets 34 and 41. The upper clamping devices are brought into their closed position with the aid of the drive mechanisms 25, 26, the tube 50 being firmly held at both its ends and at the same time being enclosed over a relatively large area. This situation is shown in FIG. 2. As an alternative, the mandrel 27 was already in this phase brought beforehand into the position which is shown in FIG. 3. The heating jaws 29 are brought into the heating position and remain in this position for such a period as is necessary for heating the material in the central sections of the tube to a temperature below the glass transition temperature Tg. The drive element 24 now shifts the two sets of clamping devices in the direction away from one another, the central sections of the tube being stretched, with simultaneous thinning of the tube wall, in such a way that the tube is given the appearance shown in FIG. 4. Preferably, stretching amounts to at least a factor of 3, and the reduction in thickness thus also amounts to a factor of 3. During the entire drawing step, the mandrel 27 is located in the interior of the tube, within the stretched zone, and this prevents the stretched zone from assuming an undesirably small diameter.

The closed space in the interior of the tube is subjected to pressure, the material being expanded into the zone concerned until it makes contact with the outer mould 57. In this step, the future mouth parts and parts of the adjacent neck sections in two blank parts connected to one another are shaped to give pre-mouldings. On contact with the surfaces of the outer mould, the material in the tube is cooled so that it becomes dimensionally stable. With simultaneous retraction of the mandrel 27 into its starting position, the outer mould is opened and a severing disc 28 divides the tube at the transition between the two future mouth parts. This produces two separate blank parts which are closed at one end by reshaping and are provided with the requisite closing surfaces at the other end by reworking. In this way, a tubular pre-moulding as shown in FIG. 13 is obtained.

The design of the equipment for closing one end, and likewise for the reworking, which may be necessary, of the mouth part, is not shown in the figures, but this can be in accordance with any technology already known and used. Normally, closing is effected by heating the material at one end of the tube to a temperature above the glass transition temperature Tg, after which the end is forced in the axial direction against a substantially spherical shell which compresses the soft material and closes the end. Subsequently, the gripper 28 takes the two blank parts formed out of the production equipment after the two sets of clamping devices have released the pre-mouldings. Subsequently, the course of the process described above is repeated.

Figure 7:
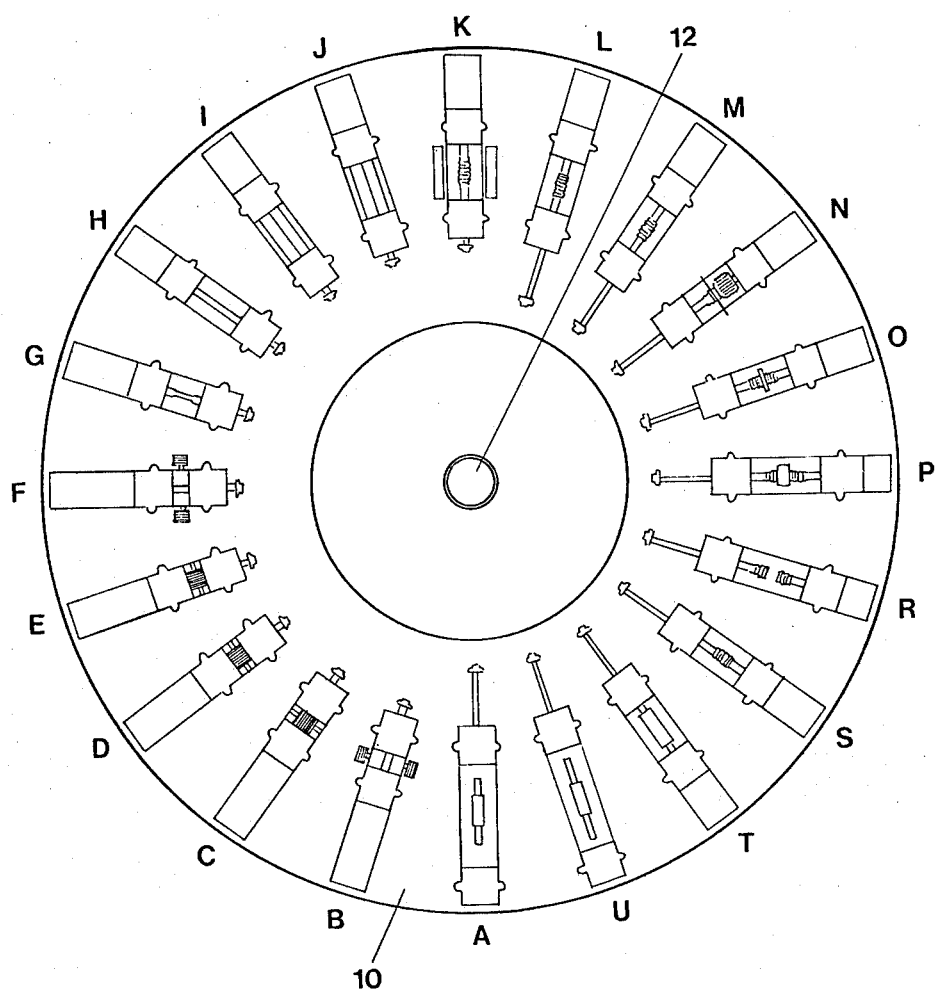
FIG. 7 shows, in diagrammatic view, a device for the stepwise production of blank parts for pre-mouldings.

According to a preferred embodiment of the invention, the production step described above is carried out with the aid of the equipment shown in FIG. 7. In position A, the tube is fed to the two sets of clamping devices, in position B the two sets of clamping devices are shifted in the direction towards one another, while simultaneously the mandrel is introduced into the tube, and in position C–E the central zone of the tube is heated, while in position F the heating process is interrupted. In positions G–H, the central sections of the tube are stretched, in position I the outer moulds move into the moulding position, in position J the interior of the tube is subjected to pressure and is formed to give the future mouth parts with the adjacent neck sections. In position K, the outer moulds open, while in position L the mandrel is retracted into its starting position.

Position M is a cooling position for stabilizing the form of the tube or, alternatively, is a reserve position, while in position N the tube is severed into two blank parts. In position O, the two future mouth parts are heated for reworking, if appropriate, and they obtain their final form in position P. In position R, the devices for reworking the mouth parts have assumed again their starting position, and subsequently, in position S, the blank parts have been shifted in the direction towards one another in order to enable the gripper to engage in position T and to enable the clamping devices to open in position U, so that the mouldings formed can be removed from the production equipment according to FIG. 7. Advantageously, the gripper device here transfers the blanks to devices for closing one of their ends. Such devices can either be provided independently of the equipment just described, or they can form part of this equipment.

In the latter case, this equipment must be provided with a further number of positions.

During cold-drawing of the central zone of the tube, the material is heated before the drawing step with the aid of an annular heating element 38 (FIG. 8) over an annular zone within the central zone. This heating element is preferably designed to heat the central zone as far as one of the sets of clamping devices. To control the direction of displacement during the flow which sets in on drawing, the material is normally cooled immediately next to the heated annulus in that direction in which it is intended that the flow step should not propagate. In the embodiments in which the entire material of the tube is to be drawn between the two sets of jaws, the required cooling is obtained by the cooled jaws. In other embodiments, annular cooling devices are used which, in principle, are arranged in a manner corresponding to the arrangement of the heating device 38.

On warm-drawing of the central zone of the tube, one or several annular heating elements are used in certain application examples in order to produce the desired temperature profile in the central zone of the tube before the latter is drawn. The annular heating elements here frequently consist of zones of elevated temperature in the heating jaws 29.

On cold-drawing of the material in the central zone of the tube, flow of the material sets in first in the annular zone which has been heated by the annular heating element 38. On further stretching of the central zone of the tube, the flow zone of the material is displaced in the direction of the other set of clamping devices, compare FIG. 9, so that, after completion of the stretching step, a central drawn zone has been formed, the appearance of which is shown in FIG. 10. On cold-drawing, the central zone has no tendency towards a reduction of the internal diameter of the tube, as long as stretching is limited to about a factor of 3. In this embodiment of the invention, it is thus not necessary to cause the mandrel 27 to assume its position in the tube before the actual stretching step. FIGS. 11-12 show an embodiment of the invention in which the stretched central zone 51a has a greater length than in the embodiments of the invention so far described. When the interior of the tube is subjected to pressure, parts of adjacent neck sections are also formed, in addition to the two future mouth parts, these neck sections being given a greater diameter than that of the actual mouth part. At this stage, it is preferable to allow the future neck section to be shaped to such an extent that the greatest rise in diameter is at least 3-fold. This has the advantage that a relatively dimensionally stable neck section is formed which, during the subsequent heating in conjunction with the shaping of the remaining part of the container, is affected only to a small extent. The appearance of a pre-moulding, which was formed from a blank part partially shown in FIG. 12, can be seen in FIG. 14.

In the above description, it was explained how the blank parts are formed by severing the drawn and shaped tube. In a preferred embodiment of the invention, severing of the blank parts from one another is effected with the aid of one or several severing discs which revolve under pressure about the circumferential surface of the tube formed at the transition between the two future mouth parts.

It was assumed in the above description that heating of the central material sections of the tube is effected by heating jaws. To obtain the most uniform heating of the material possible, the tube should preferably rotate relative to the heating element. To make this possible, the clamping devices are modified, if appropriate having cone-type bearings or having heated jaws which revolve about the tube.

In the case where the central sections of the tube are drawn at an initial temperature which is below the glass transition temperature Tg, the material is heated after the drawing step to a temperature above the glass transition temperature Tg, after which the future mouth part and parts of the adjacent neck sections are shaped.

While only a limited number of embodiments have been shown and described in detail then will now be obvious to those skilled in the art many modifications and variations satisfying many or all of the objects of the invention without departing from the spirit thereof as defined by the approved claims.

What is claimed is:

1. Apparatus for the manufacture of a tubular pre-molding having an oriented region for a mouth part of a finished container and an amorphous region for a body part of the finished container, said apparatus comprising:

first and second spaced clamping means for clamping a tubular parison of thermoplastic material in axially spaced regions to leave a central section of said parison between the clamping means, means for relatively axially displacing said first and second clamping means to stretch the parison in the central section between the clamped regions, means for maintaining the diameter of the parison in said central section during stretching of the material such that the material undergoes axial orientation in said central section while its diameter is maintained, said first and second clamping means having surfaces for engaging the parison configured so that while the central section is being stretched the material in the clamped regions retains its original thickness and amorphous state, a mold surrounding said central section, said mold including a portion shaped to form a mouth part of a finished container, means for heating the material in said central section to a temperature above the glass transition temperature, means for expanding the thus heated material in said central section into contact with the mold to form said mouth part of the finished container from the axially oriented material, means for separating said mouth part together with the amorphous material in one of said clamped regions from the clamping means and mold, the construction and arrangement of the clamping means and the displacement thereof to form the stretched region of the parison being such that the amorphous material not axially oriented by the stretching of the parison is of a length sufficient for reforming into the body part of the finished container.

2. Apparatus as claimed in claim 1 wherein said clamping means is of a length to provide the amorphous material not axially oriented by the axial stretching of the parison.

3. Apparatus as claimed in claim 1 wherein said mold includes two adjoining portions shaped for forming respective mouth parts for associated containers, the apparatus further comprising means for severing the parison at said mouth parts whereby two pre-molding segments are obtained each having a mouth part of oriented material and an amorphic part previously gripped by a respective one of the clamping means.

4. Apparatus as claimed in claim 1 comprising means for heating the material in a localized zone of said central section to a temperature above the glass transition temperature before the material is axially stretched in order to provide an initiation zone at which stretching commences.

5. Apparatus as claimed in claim 4 wherein the material is heated in the localized zone to a temperature which exceeds the temperature of the adjacent material by from 3° to 20° C.

6. Apparatus as claimed in claim 1 comprising means for forming a localized annular zone of reduced thickness in said central section before axial stretching of the material to provide an initiation zone at which stretching commences.

7. Apparatus as claimed in claim 1 comprising means for applying local external pressure to the parison in a localized annular region in said central section to provide an initiation zone at which stretching commences.

8. Apparatus as claimed in claim 1 wherein said mold has walls positioned relative to the parison such that the mouth part formed by the expansion of the material is stretched in the circumferential direction by a factor of more than 2.

9. Apparatus as claimed in claim 1 wherein said means for maintaining the diameter of said parison comprises a mandrel.

* * * * *